United States Patent
Després (10) Patent No.: US 12,466,706 B2
(45) Date of Patent: Nov. 11, 2025

(54) IMPACTOR APPARATUS OPERATED FROM ROTORCRAFT

(71) Applicant: FABRICATIONS TJD INC., Rivière-du-Loup (CA)

(72) Inventor: Jean Després, St-Antonin (CA)

(73) Assignee: FABRICATIONS TJD INC., Revière-du-Loup (CA)

( * ) Notice: Subject to any disclaimer, the term of this patent is extended or adjusted under 35 U.S.C. 154(b) by 554 days.

(21) Appl. No.: 17/606,578

(22) PCT Filed: Apr. 27, 2020

(86) PCT No.: PCT/CA2020/050549
§ 371 (c)(1),
(2) Date: Oct. 26, 2021

(87) PCT Pub. No.: WO2020/215165
PCT Pub. Date: Oct. 29, 2020

(65) Prior Publication Data
US 2022/0220756 A1    Jul. 14, 2022

Related U.S. Application Data

(60) Provisional application No. 62/839,213, filed on Apr. 26, 2019.

(51) Int. Cl.
*B66D 5/10*    (2006.01)
*B66D 1/16*    (2006.01)
(Continued)

(52) U.S. Cl.
CPC ............ *B66D 5/10* (2013.01); *B66D 1/16* (2013.01); *B66D 1/60* (2013.01); *E04G 23/084* (2013.01)

(58) Field of Classification Search
CPC .......... E04G 23/084; B64D 1/22; B66D 1/16; B66D 1/60; B66D 5/10; B66D 1/28; B66D 1/741
See application file for complete search history.

(56) References Cited

U.S. PATENT DOCUMENTS 3,612,486 A * 10/1971 Martin .................... B66D 1/48
                                                    254/386
3,715,084 A    2/1973 Weiss
(Continued)

FOREIGN PATENT DOCUMENTS

CN    2913312 Y    6/2007
CN    103576184    2/2014
(Continued)

OTHER PUBLICATIONS

"Wreckingball from helicopter used to remove unstable rock in Norway (Oppdølsstranda)," May 12, 2011, YouTube, https://www.youtube.com/watch?v=N8JLfTOr058, retrieved Aug. 6, 2024 (Year: 2024).*

(Continued)

*Primary Examiner* — Anna M Momper
*Assistant Examiner* — Nathaniel L Adams
(74) *Attorney, Agent, or Firm* — NORTON ROSE FULBRIGHT CANADA LLP (57) ABSTRACT

An impactor apparatus for use with a rotorcraft, comprises a reeling apparatus adapted to be transported by the rotorcraft, the reeling apparatus including at least a spool, an actuation system for rotating a spool in a winding direction, and a brake system for braking a rotation of the drum. A cable is wound onto the spool. An impactor mass is attached to a free end of the cable. A release of the brake system causes a drop of the impactor mass by gravity, from a loaded condition, the actuating system subsequently rotating the (Continued)

spool to wind the cable onto the spool to put the impactor mass in a loaded condition.

20 Claims, 9 Drawing Sheets

(51) Int. Cl.
 *B66D 1/60* (2006.01)
 *E04G 23/08* (2006.01)

(56) References Cited

U.S. PATENT DOCUMENTS

| | | | |
|---|---|---|---|
| 3,805,900 A | | 4/1974 | Sainsbury |
| 3,907,075 A | | 9/1975 | Christison et al. |
| 4,317,501 A | | 3/1982 | Gleize |
| 5,020,962 A | * | 6/1991 | Ramun ................ E04G 23/08 |
| | | | 212/262 |
| 5,314,166 A | * | 5/1994 | Muir ................ B66D 1/7415 |
| | | | 254/371 |
| 5,788,186 A | | 8/1998 | White |
| 2010/0187488 A1 | * | 7/2010 | Gargaro, III ............ B66D 1/12 |
| | | | 254/362 |
| 2016/0068376 A1 | * | 3/2016 | Fretz ................ B66D 1/16 |
| | | | 254/219 |
| 2016/0325454 A1 | * | 11/2016 | Povroznik, III ......... B64D 1/22 |
| 2016/0341259 A1 | | 11/2016 | Maghsoodi et al. |
| 2017/0050827 A1 | | 2/2017 | Nield et al. |
| 2018/0201489 A1 | * | 7/2018 | Schmidt ............... B66D 1/7415 |

FOREIGN PATENT DOCUMENTS

| | | | | |
|---|---|---|---|---|
| CN | 103576184 A | * | 2/2014 | |
| CN | 105040697 A | | 11/2015 | |
| EP | 0720962 B1 | * | 4/2001 | ............... B66D 5/04 |
| JP | H09255290 A | * | 9/1997 | |
| JP | 2000144704 A | * | 5/2000 | |
| JP | 2005229828 A | | 9/2005 | |
| RU | 2 223 365 C1 | | 2/2004 | |

OTHER PUBLICATIONS

"Air Hogs Fly Crane and Wrecking Ball Remote Control Vehicle," Walmart.com, Jan. 11, 2012, https://www.walmart.com/ip/Air-Hogs-Fly-Crane-and-Wrecking-Ball-Remote-Control-Vehicle-Red/16933025, retrieved Aug. 6, 2024 from web.archive.org (Year: 2024).*

* cited by examiner

IMPACTOR APPARATUS OPERATED FROM ROTORCRAFT

CROSS-REFERENCE TO RELATED APPLICATION

The present application claims the priority of U.S. Patent Application Ser. No. 62/839,213, filed on Apr. 26, 2019 and incorporated herein by reference.

TECHNICAL FIELD

The present disclosure relates to wrecking-ball type impact or equipment.

BACKGROUND

Large-scale demolition equipment such as wrecking balls operate with the momentum of a mass impacting objects. While such systems are effective, the mass must be hung from a surrounding structure such as a crane. This may render the use of wrecking balls inappropriate or unfeasible, when time is a factor, such as in emergencies. In other scenarios, it may not be possible to bring a crane to a demolition site.

SUMMARY

In a first aspect, there is provided an impactor apparatus for use with a rotorcraft, comprising: a reeling apparatus adapted to be transported by the rotorcraft, the reeling apparatus including at least a spool, an actuation system for rotating a spool in a winding direction, and a brake system for braking a rotation of the drum; a cable wound onto the spool; and an impactor mass attached to a free end of the cable; wherein a release of the brake system causes a drop of the impactor mass by gravity, from a loaded condition, the actuating system subsequently rotating the spool to wind the cable onto the spool to put the impactor mass in a loaded condition.

Further in accordance with the first aspect, for instance, the reeling apparatus includes a clutch unit between the actuation system and the spool.

Still further in accordance with the first aspect, for instance, the clutch unit includes at least one spring exerting a biasing force between the actuation system and the spool.

Still further in accordance with the first aspect, for instance, the at least one spring surrounds a shaft of the actuation system, and is between an abutment surface secured to the shaft and a coupler secured to the spool.

Still further in accordance with the first aspect, for instance, the coupler is a disk inside a cavity of a core of the spool.

Still further in accordance with the first aspect, for instance, the at least one spring is at least one Belleville spring.

Still further in accordance with the first aspect, for instance, the clutch unit includes a tensioner for adjusting the biasing force applied by the spring.

Still further in accordance with the first aspect, for instance, the tensioner has at least one fastener applying a pressure on the at least one spring.

Still further in accordance with the first aspect, for instance, the at least one fastener is located inside a cavity of a core of the spool and is accessed from an exterior of the reeling apparatus.

Still further in accordance with the first aspect, for instance, the actuation system includes an electric motor and a gear box.

Still further in accordance with the first aspect, for instance, a rotational axis of the motor is transverse to a rotational axis of the spool.

Still further in accordance with the first aspect, for instance, the brake system includes a strap selectively applying a braking force on a drum surface of the spool.

Still further in accordance with the first aspect, for instance, the brake system includes a piston and at least one brake spring biasing the brake system to apply the braking force.

Still further in accordance with the first aspect, for instance, the brake system includes a braking actuator operatively connected to piston to apply a force against a biasing action of the at least one brake spring to release the braking force.

Still further in accordance with the first aspect, for instance, the braking actuator is electrically powered.

Still further in accordance with the first aspect, for instance, the brake system includes a locking actuator operatively connected to piston to apply a force concurrent with a biasing action of the at least one brake spring to lock the brake system.

Still further in accordance with the first aspect, for instance, the locking actuator is electrically powered.

Still further in accordance with the first aspect, for instance, the reeling apparatus includes a cutter assembly adjacent to the cable and operable to section the cable.

Still further in accordance with the first aspect, for instance, the cutter assembly has a frame defining a hole for passage of the cable therethrough, and a cutter in guillotine arrangement with the hole.

Still further in accordance with the first aspect, for instance, the cutter is spring-loaded in a loaded condition, the cutter assembly having a detent mechanism for releasing the cutter from the loaded condition.

Still further in accordance with the first aspect, for instance, the detent mechanism is actuated by a cutter actuator.

Still further in accordance with the first aspect, for instance, the cutter actuator is electrically powered.

Still further in accordance with the first aspect, for instance, the frame of the cutter assembly is a carriage slidingly mounted to a frame of the reeling apparatus.

Still further in accordance with the first aspect, for instance, a controller is provided operating the actuation system and the brake system.

In a second aspect, there is provided a system for operating an impaction with an impactor mass at an end of at least one cable, comprising: at least one processing unit; a non-transitory computer-readable memory communicatively coupled to the processing unit and comprising computer-readable program instructions executable by the processing unit for actuating a rotation of a spool to maintain the cable taut, and to wind the cable on the spool without raising the impactor mass; braking the rotation of the spool to hold the impactor mass in a loaded condition; and releasing the brake to cause a drop of the impactor mass by gravity, from the loaded condition.

Further in accordance with the second aspect, for instance, the computer-readable program instructions executable are further for activating a braking actuator for releasing the brake, and deactivating the braking actuator for braking the rotation.

Still further in accordance with the second aspect, for instance, the computer-readable program instructions executable are further for activating a locking actuator to redundantly braking the rotation of the spool.

Still further in accordance with the second aspect, for instance, the computer-readable program instructions executable are further for actuating a cutter to section the cable.

In a third aspect, there is provided a system for operating an impaction with an impactor mass at an end of at least one cable, comprising: at least one processing unit; a non-transitory computer-readable memory communicatively coupled to the processing unit and comprising computer-readable program instructions executable by the processing unit for actuating a rotation of a spool to maintain the cable taut, and to wind the cable on the spool without raising the impactor mass; braking the rotation of the spool to hold the impactor mass in a loaded condition; and operating an electromagnet to cause a drop of the impactor mass by gravity, from the loaded condition.

Further in accordance with the third aspect, for instance, the computer-readable program instructions executable are further for deactivating a braking actuator for braking the rotation.

Still further in accordance with the third aspect, for instance, the computer-readable program instructions executable are further for activating a locking actuator to redundantly braking the rotation of the spool.

Still further in accordance with the third aspect, for instance, the computer-readable program instructions executable are further for actuating a cutter to section the cable.

DESCRIPTION OF THE DRAWINGS

Reference is now made to the accompanying figures in which.

DETAILED DESCRIPTION

Figure 1:
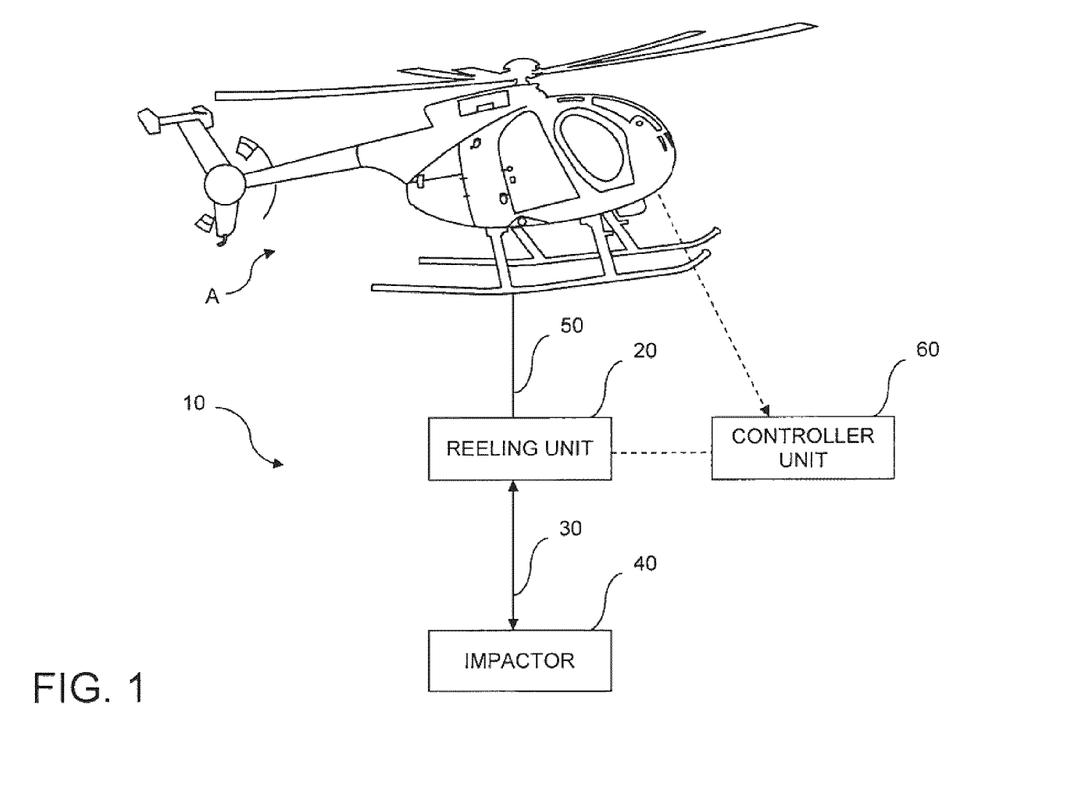
FIG. 1 is a block diagram of an impactor apparatus with rotorcraft in accordance with the present disclosure.

Referring to the drawings, there is shown an impactor apparatus 10 in accordance with the present disclosure. The impactor apparatus 10 is of the type that may be operate from rotorcraft A, such as helicopters, drones, etc. The impactor apparatus 10 may have one or more of a reeling apparatus 20, a cable or cables 30, an impactor mass 40, a sling 50, a controller 60.

The reeling apparatus 20 is the structural and operational unit of the impactor apparatus 10, in that it will hold and release the cable 30 with impactor mass 40, to then reel them back into a loaded condition.

The cable 30 is typically a metal cable from which the impactor mass 40 is hung. The cable 30 may also be known as a rope, a sling, etc.

Figure 13:
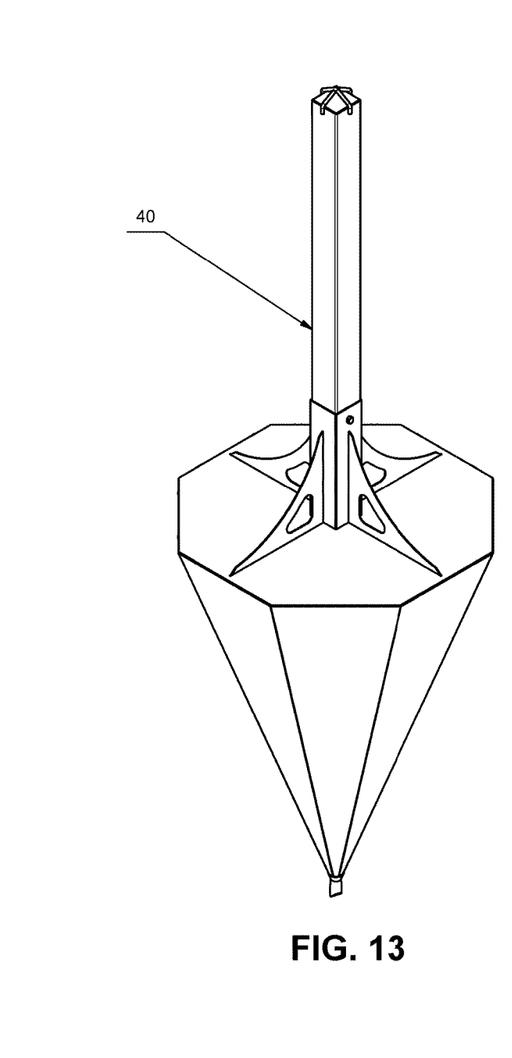
FIG. 13 is a perspective view of an exemplary embodiment of an impactor mass.

The impactor mass 40 is a mass of any appropriate shape selected to perform the impact. For example, the impactor mass 40 may be a ball, or may have any other appropriate shape, such as the one shown in FIG. 13. The impactor mass 40 may be heavy, shock resistant, hollow (for buoyancy), pointy.

The sling 50 may interface the reeling apparatus 20 to the rotorcraft A in an embodiment, though the reeling apparatus 20 may be fixed directly to the rotorcraft A.

The controller unit 60 may optionally be present, to operate the reeling apparatus 20. The controller unit 60 may include a processor and wireless or remote control capability.

The reeling apparatus 20 may have numerous assemblies, systems, units, etc, to operate in the manner described below. For example, the reeling apparatus 20 may have a frame 210, a spool assembly 220, an actuation system 230, a clutch unit 240, a brake system 250 and/or a cutter assembly 260, all of which are described below. In accordance with an embodiment, referring to FIGS. 2 and 3, the reeling apparatus 20 has a frame 210 to supports its numerous components. The frame 210 may be rigidly secured to the rotorcraft A, and/or may be hung from the rotorcraft A by the sling 50, as a possibility.

Figure 2:
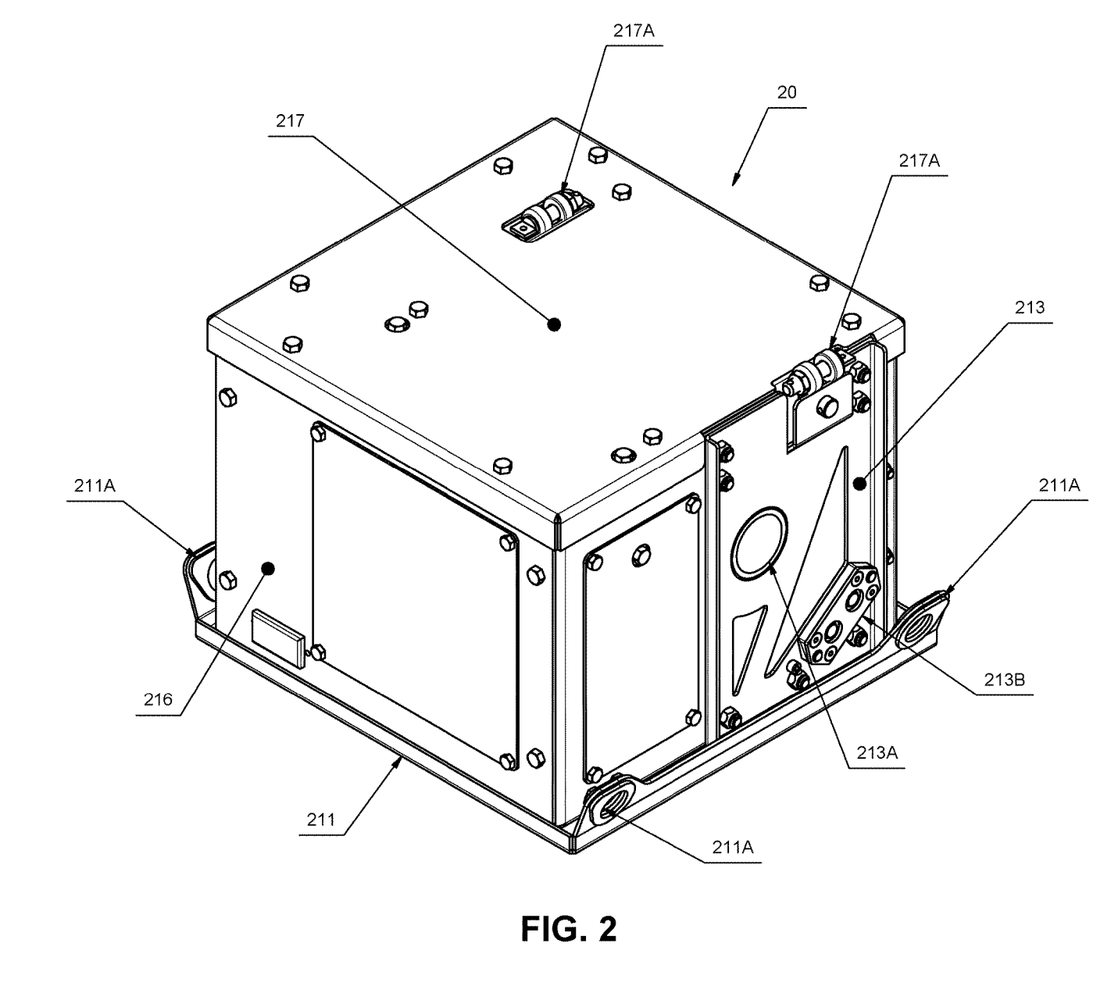
FIG. 2 is a perspective view of the reeling apparatus in accordance with the present disclosure.
Figure 3:
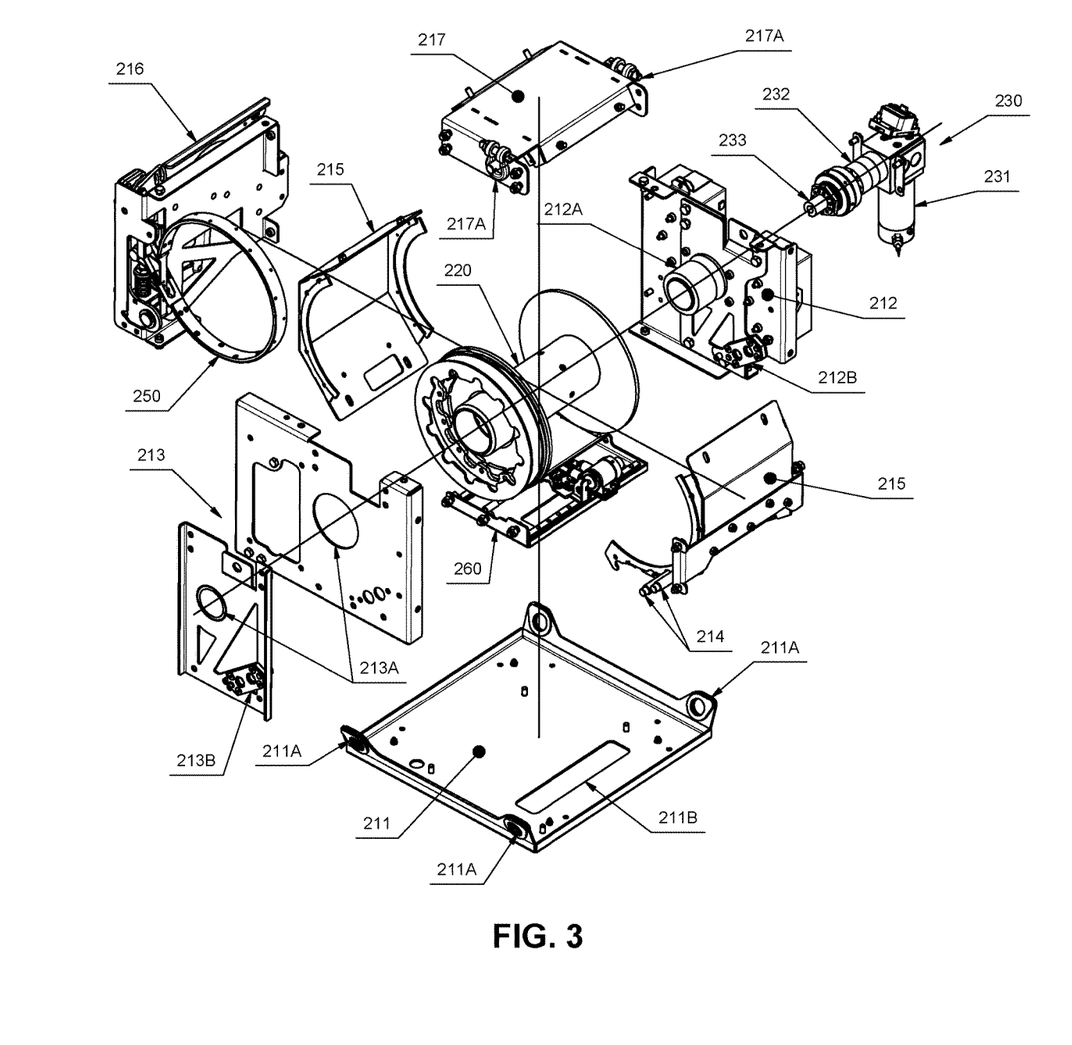
FIG. 3 is an assembly view of the reeling apparatus of FIG. 2.

The frame 210 may have different configurations with frame members of different types. For example, the frame 210 may be made of a tubular or elongated frame members to have a skeleton like appearance. In another embodiment, as shown, the frame 210 is made of plate members. The frame 210 may also be a combination of elongated frame members and plate members, with the configuration of FIGS. 2 and 3 provided as an example only.

The frame 210 may have a base plate 211 that supports other components of the reeling apparatus 20. The base plate 211 may have connectors to be secured or connected to the apparatus 10. For example, the base plate 211 may have eyelets 211A at its four corners to be attached to the apparatus 10 by cables, e.g., forming the sling 50. Chains, rods, etc may be used as well. A slot 211B may be defined in the base plate 211 and may be present for the cable 30 to pass through the base plate 211.

An end wall assembly 212 may project upwardly from the base plate 211. The end wall assembly 212 may be defined by one or more plates, e.g., structural components in steel, body components in aluminum. The end wall assembly 212 may have an axle portion 212A for rotatably supporting a rotating component, such as a spool assembly 220 described below. The end wall assembly 212 may also be used to interface the spool assembly 220 to an actuation system 230. The end wall assembly 212 may also have roller support 212B configured to support cable guides. As also observed, the end wall assembly 212 may support electrical and/or electronic components of the reeling apparatus 20.

Another end wall assembly 213 may project upwardly from the base plate 211, and is spaced from the end wall assembly 212, such that the spool assembly 220 may be located between the end wall assembly 212 and the end wall assembly 213. The end wall assembly 213 may also be defined by one or more plates, e.g., structural components in steel, body components in aluminum. The end wall assembly 213 may have a bore 213A for rotatably supporting the other end of spool assembly 220 described below. The end wall assembly 212 may also have roller support 213B configured to support cable guides, concurrently with the roller support 212B. For example, a pair of parallel rollers 214B are rollingly supported by the roller support 212B and 213B. Non-rolling bars could be used as another possibility, if cable guides are present.

Cage walls 215 may also project from the base plate 211. For example, the cage walls 215 may extend from one end wall assembly to another. The cage walls 215 may be shaped so as to surround the spool assembly 220, so as to contain the cable 30 therein. Therefore, the cage walls 215 may form a generally cylindrical enclosure around the spool assembly 220, though the cage walls 215 may be made of plate segments as shown.

A side wall assembly 216 may also project upwardly from the base plate 211, and is transversely arranged relative to the end wall assembly 212 and the end wall assembly 213. The side wall assembly 216 may also be defined by one or more plates, e.g., structural components in steel, body components in aluminum. In an embodiment, the side wall assembly 216 encloses and/or supports parts of the brake system 250 that may be operated to brake the spool assembly 220.

Figure 4:
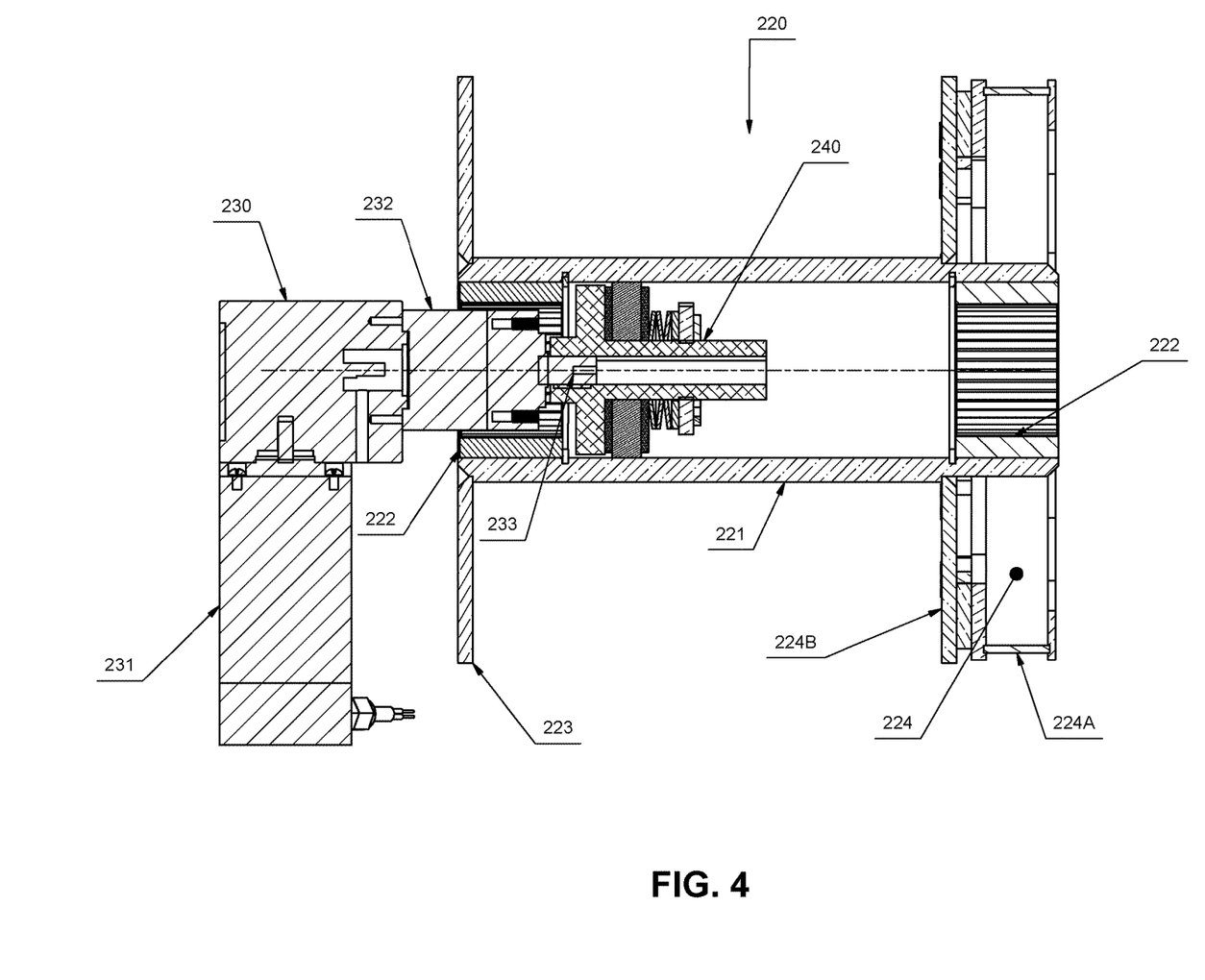
FIG. 4 is a cross sectional view of a spool assembly and actuation system of the reeling apparatus of FIG. 2.

Referring to FIGS. 3 and 4, The frame 210 rotatably supports a spool assembly 220 or spool upon which the cable 30 is wound. The spool assembly 220 may have spool defined by a core 221, upon which is wound the cable 30. The core 221 may have a cylindrical shape, for example. The core 221 may be tubular or partially hollow, to accommodate components as described herein. In an embodiment, bearings 222 are located inside the core 221, and may be connected to the end wall assemblies 212 and 213, such that the core 221 rolls on itself.

A flange 223 may be provided at one end of the core 221, and another flange or drum 224 may be positioned at the other end of the core 221, to retain the cable 30 wound around the core 221. The flange 223 and the drum 224 may be rigidly connected to the core 221 so as to rotate therewith. In particular, the drum 224 may define the braking surface of the spool assembly 220 and is operatively connected to the brake system 250. For instance, the drum 224 may be defined by a drum portion 224A separating a pair of flanges 224B, such that a collar of the brake system 250 is held captive around the drum portion 224A. Other configurations are considered.

Figure 5:
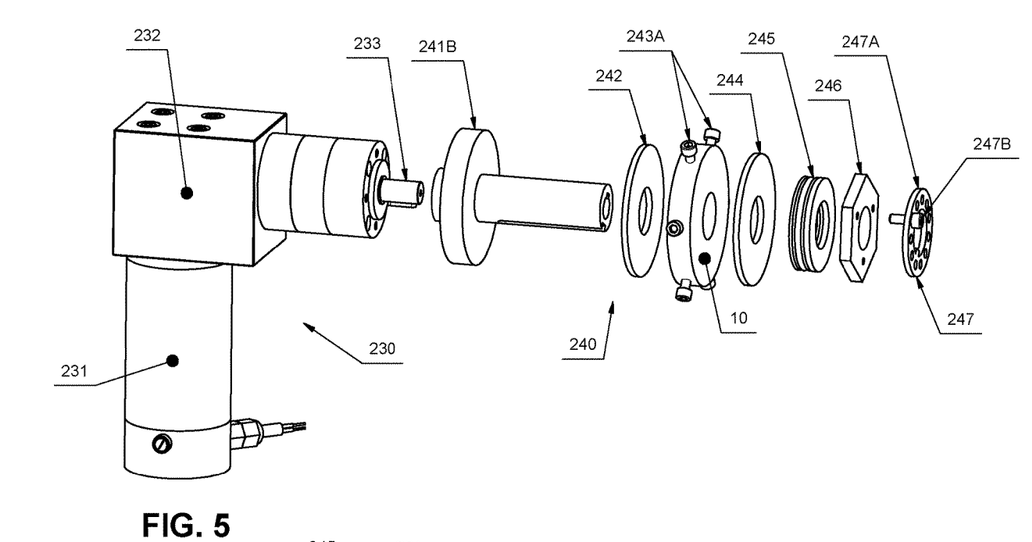
FIG. 5 is an exploded view of the actuation system and of a clutch unit of the reeling apparatus of FIG. 2.

Referring to FIGS. 3-5, an actuation system 230 is provided to collaborate with the spool assembly 220 so as to actuate a rotation of the spool assembly 220 in a winding direction. For example, the actuation system 230 has a unidirectional electrical motor 231, although other types of motor are contemplated. For example, the spool assembly 220 may be connected to the frame 210 by an automatic reeling system (e.g., with springs) to bias a rotation of the spool assembly 220 in an orientation, and hence force an autowinding or self-winding of the spool assembly 220 and cable 30 thereon. In an embodiment with the actuation system 230, the latter does not have the capacity of raising the impactor mass 40, as explained below. Consequently, the sizing of the actuation system 230 may be reduced in contrast to a motor having the capacity or lifting the impactor mass 40. In an embodiment, the axis of the motor 231 is transverse to a rotational axis of the spool assembly 220. A gear box 232 (e.g., reduction gear box) or like coupler may be used to orient a shaft 233 with the rotational axis of the spool assembly 220. Other transmissions could be present (e.g., belt drive, direct drive, etc). The gear box 232 may therefore cause a speed reduction from the shaft of the motor 231 to the spool assembly 220.

Figure 6:
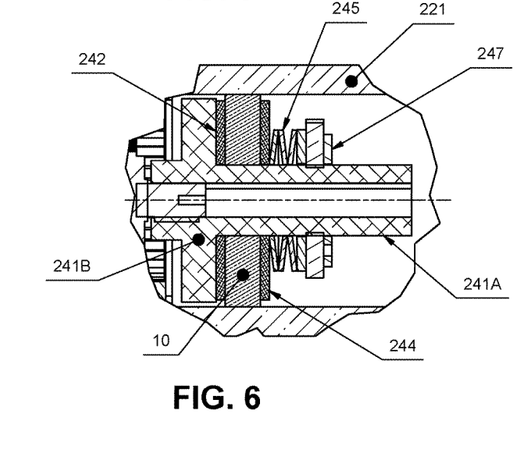
FIG. 6 is a cross sectional view of the clutch unit of FIG. 5.

Referring to FIGS. 4-6, a clutch unit 240 may be present between the spool assembly 220 and the actuation system 230. The clutch unit 240 is provided to disengage the spool assembly 220 from the actuator unit 230. More particularly, in an embodiment, the actuation system 230 does not have the capacity of raising the impactor mass 40, as explained below. If the tension is beyond a given threshold in the cable 30, the clutch unit 240 may disengage the spool assembly 220 from the actuation system 230.

According to an embodiment, the clutch unit 240 has a support 241 that is mounted to the shaft 233 so as to rotate therewith. In an embodiment, other components of the clutch unit 240 are mounted directly to the shaft 233 (or to the shaft of the motor 231), i.e., without the support 241. The support 241 may have its own shaft 241A coaxial with the shaft 233 and with the rotational axis of the spool assembly 220. An abutment 241B, such as a flange, may be at an end of the shaft 241A.

The clutch unit 240 may have different combinations of a series of components mounted to the shaft 241A. For example, the clutch unit 240 may have at least some of a washer 242, a coupler 243, another washer 244, one or more Belleville springs or washers 245, a lock ring 246 and/or a tensioner 247, sequentially. For instance, one or both of the washers 242 and 244 may be absent. The washers 242 and 244 may be wear components as they may erode or wear as the coupler 243 rotates against them.

The coupler 243 may be a disk or like component, with a central bore so as to be mounted around the shaft 241A. Fasteners 243A may be provided to secure the coupler 243 to the core 221 of the spool assembly 220, such that the coupler 243 rotates with the core 221. The core 221 may thus even be part of the spool assembly 220 as opposed to being part of the clutch unit 240. The coupler 243 could be welded or connected by other suitable ways to the core 221 (e.g., splines) so as to rotate with it. The coupler 243 may be generally free to rotate about the shaft 241A.

The Belleville spring 245 may also be known as a conical spring washer, coned-disc spring, disc spring, cupped spring washer. The Belleville spring has a conical shell which that is loaded along its axis, with the frusto-conical shape giving the spring 245 its characteristic biasing force. The spring 245 is configured to positioned to apply a coupling force on the coupler 243, so as to engage the coupler 243, and thus the spool assembly 220, with the shaft 241A. In an embodiment, a coil spring is used instead of, or in supplement to, a Belleville spring.

A lock ring 246 or like abutment is secured to the shaft 241A, at a fixed axial position. The lock ring 246 rotates with the shaft 241A. The lock ring 246 may be secured to the shaft 241A by any appropriate means. For example, the lock ring 246 may be bolted, screwed, welded, etc to the shaft 241A. In an embodiment, the position of the lock ring 246 is such that it compresses the spring 245, such that a given biasing force is applied against the coupler 243. A frictional force consequently results, such as via the washer 244, to engage the coupler 243 with the shaft 241A in rotation, the frictional force being proportional to the biasing force.

Optionally, the tensioner 247 may be present to adjust the biasing force. In an embodiment, the tensioner 247 includes a ring 247A that is fixed to the lock ring 246. The ring 247A has one or more threaded holes to receive bolts 247B or like fasteners (e.g., set screws). The bolts 247B may be screwed toward the spring(s) 245, passing for example through holes 246A in the lock ring 246 to compress the spring 245 against the coupler 243, consequently increasing the biasing force. In another embodiment, the holes 246A in the lock ring 246 are threaded, such that the ring 247A may not be necessary. In another embodiment, the lock ring 246 is screwed to the shaft 241A, and its axial position may be adjusted to increase or decrease the biasing force. The arrangement featuring the bolts 247B may provide for in situ adjustment of the biasing force. For example, the frame 210 has the bore 213A in the end wall assembly 213 aligned with the core 221, such that a user may access the bolts 247B.

Figure 7:
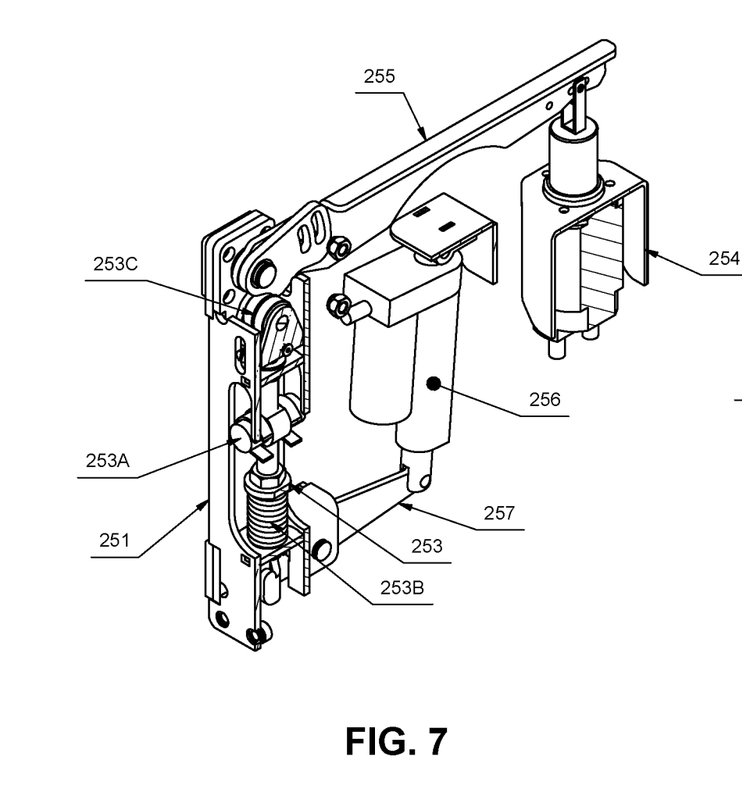
FIG. 7 is a perspective view of a brake system of the reeling apparatus of FIG. 2.
Figure 8:
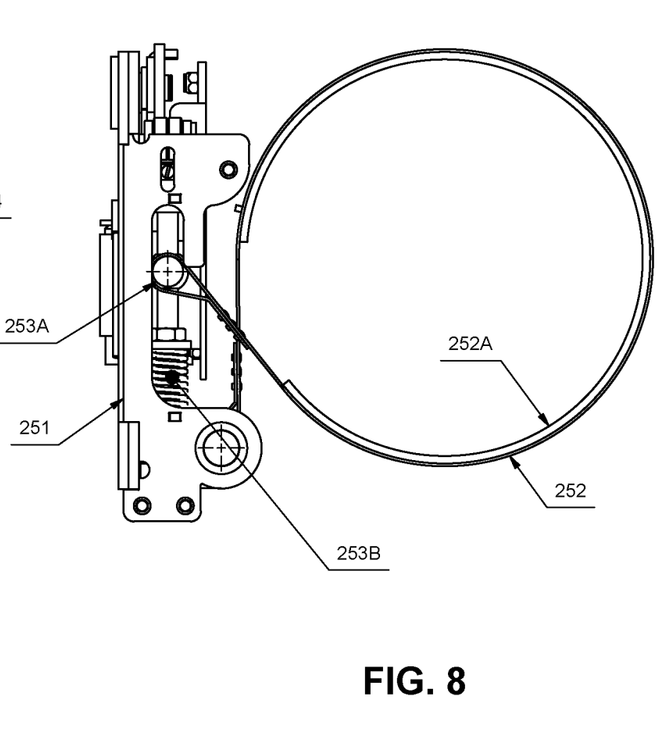
FIG. 8 is an elevation view of the brake system of FIG. 7.
Figure 9:
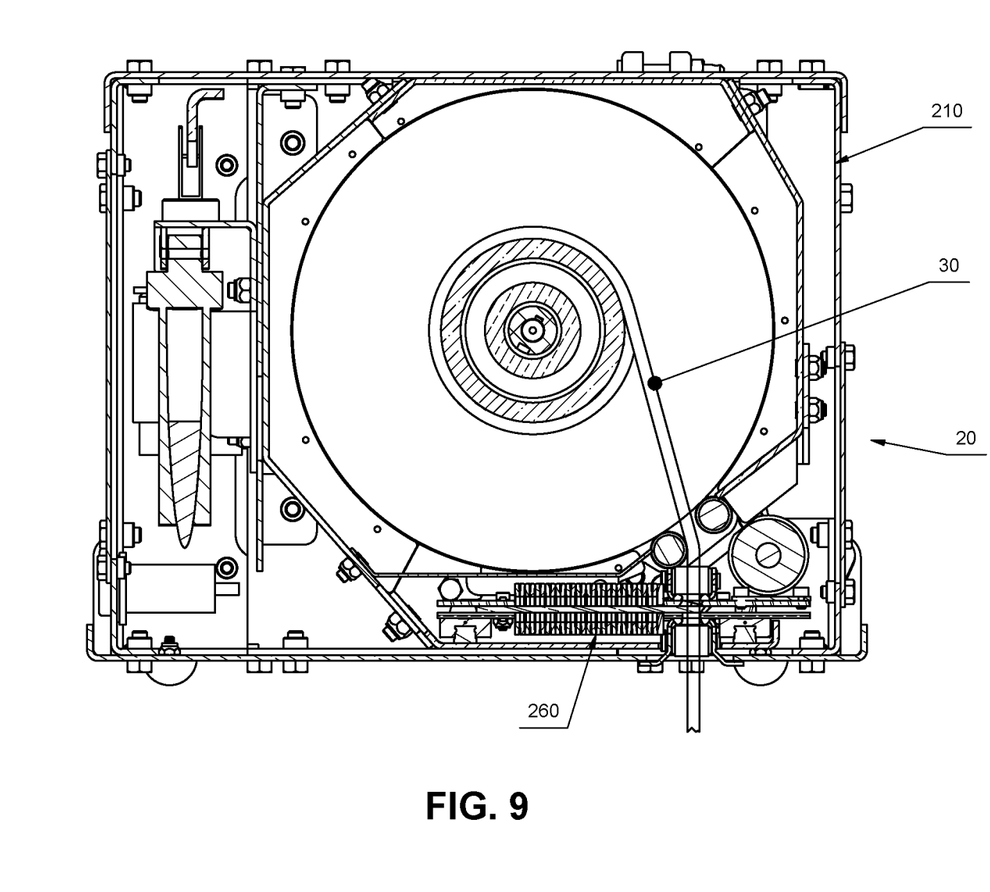
FIG. 9 is an elevation view of the reeling apparatus showing a cutter assembly thereof.

A brake system 250 may be present as well. The brake system 250 may be of any appropriate type, including a disc brake set 25A with a disc on a shaft or like rotating part of the spool assembly 220. Referring to FIGS. 7 and 8, a brake system 250 is shown in greater detail. The brake system 250 may be activated in order to stop the spool assembly 220 from rotating. This may imply that the clutch unit 240 disengages the drive of the actuation system 230 from the spool assembly 220, as a result of the action of the brake system 250.

The brake system 250 is shown as being a drum brake in that it applies a braking force to the drum 224 of the spool assembly 220. Other types of brake systems may be used, such as disc brakes, rim brakes, etc, all of which could be used as alternatives. The brake system 250 has a brake frame 251 that is mounted to a structure of the reeling apparatus 20. For example, the brake frame 251 could be mounted to the side wall 216 (FIG. 3) although the brake frame 251 could be mounted elsewhere. The brake system 250 may have a brake strap 252 that forms a loop in the manner shown in FIG. 8. The brake strap 252 is connected at a first end to the brake frame 251 and to a piston 253, or like translational device, at a second end thereof. A wear member 252A may be optionally positioned inside the brake strap 252 and comes into contact with the brake drum 224. The brake strap 252 surrounds the drum 224 and, in a braking action, strangles the drum 224 so as to prevent it from rotating. In order to cause this strangling braking action, the piston 253 has a strap connector 253A that is displaceable in translation for example, as mounted to its piston shaft. Springs 253B may act on the piston 253 in an embodiment bias the strap connector 253A toward a braking position. The springs 253B may be one or more coil springs, as an example, although it is also considered to use other types of springs including spring washers. Thus, the springs 253B exert a biasing force for the strap connector 253A of the piston 253 to be biased upwardly in FIG. 8 such that the brake strap 252 strangles the drum 224.

In order to release the braking, the piston 253 must exert a force against the springs 253B—the brake system 250 as shown may be referred to as a normally braking system. A head 253C is at a free end of the piston 253 and when a force is applied on the head 253C, the strap connector 253A may translate downward. A braking actuator 254 is coupled to the head 253C by way of a linkage 255. For example, the braking actuator 254 is an electrically activated device such as a solenoid, a linear actuator, though other types of devices may be used. A translation force applied by the braking actuator 254 is converted by the linkage 255 into a downward push on the head 253C, causing the downward movement of the strap connector 253A. Other arrangements are considered—the arrangement shown with the linkage 255 has a levering effect on the piston 253, by the position of its pivot axis farther from the braking actuator 254 than from the contact point with the head 253C. In another embodiment, the braking actuator 254 may, for example, push straight against the piston 253, i.e., without linkage 255.

Deactivation of the brake system 250 would require a counterforce to be applied to the brake system 25, such as an electrical signal and/or applied mechanical force. Stated differently, in an embodiment, the brake system 250 may normally block a rotation of the spool assembly 220, unless a signal or force is applied to the brake system 25. In another embodiment, the arrangement is not a normally braking arrangement but a normally released arrangement. In such an arrangement, as the braking actuator 254 is actuated, it causes a release of the braking.

In an embodiment, the brake system 250 may have another actuator, shown as locking actuator 256. The locking actuator 256 may be another electrically actuated device, e.g., another solenoid, as a possibility among others. The locking actuator 256 may be used with linkage 257 in order to apply a force concurrent to that of the springs 253B. Therefore, the locking actuator 256 provides supplemental and redundant braking actuation. In an embodiment, the locking actuator 256 may be actuated as a safety to ensure that the spool assembly 220 does not rotate, to complement the action of the springs 253C. This may for instance be of use when the reeling apparatus 20 with the impactor mass 40 is transported over sensitive zones.

Referring to FIGS. 9 to 12, a cutter assembly is generally shown at 260. The cutter assembly 260 is optional and may be present in order to section the cable 30 in particular circumstances. The cutter assembly 260 is mounted to the frame 210, e.g., to the base plate 211, via a pair of rails 261. The cutter assembly 260 may have its own frame, for instance in the form of a carriage 262 is slidingly connected to the rails 261 so to move in translation for the carriage to move along the slot 211B in the base plate 211 of the frame 210. This translational movement is to follow the cable 30 along the spool assembly 220.

Figure 10:
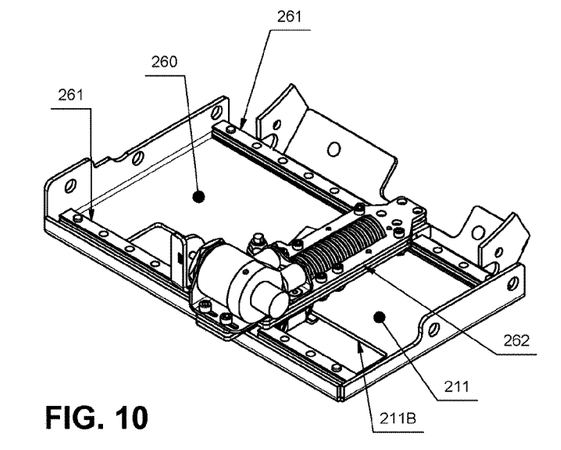
FIG. 10 is a perspective view of the cutter assembly of FIG. 9 as mounted to a frame of the reeling apparatus.
Figure 11:
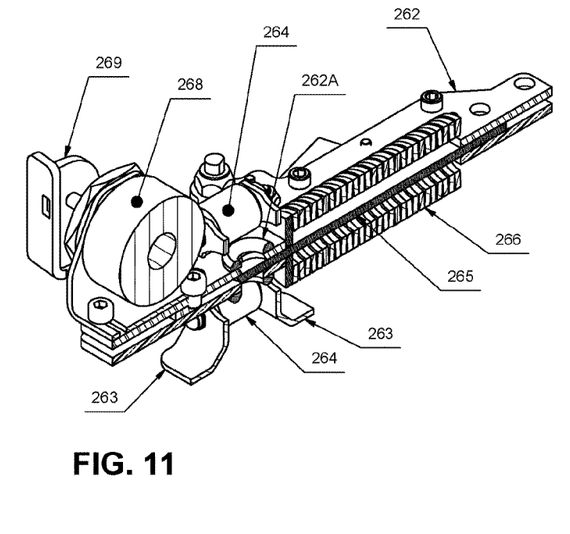
FIG. 11 is a perspective sectional view of the cutter assembly of FIG. 10.
Figure 12:
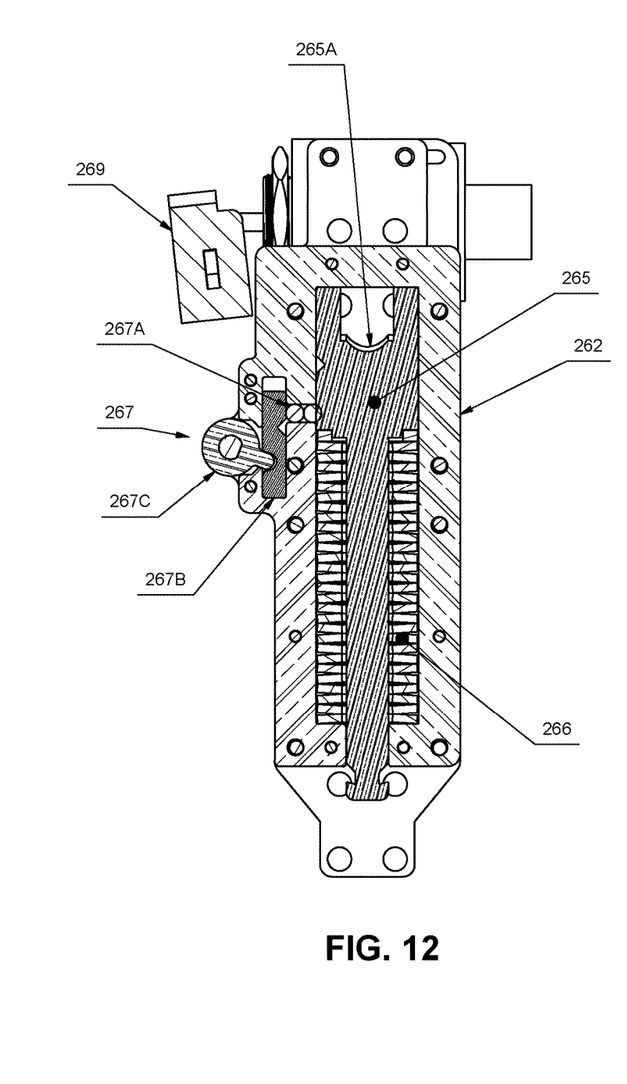
FIG. 12 is a sectional view of the cutter assembly of FIG. 10.

The carriage 262 may, for example, be made of a pair of plates forming a gap therebetween, as one of numerous embodiments. A hole 262A may be provided and may extend through the two plates of the carriage 262., with the cable 30 passing through the hole 262A. Sliders 263 may optionally be connected to the carriage 262 so as edges of the slot 211B of the base plate 211 from the cable 30. Idlers 264 are provided at the periphery of the hole 262A, or like guides (rollers, low friction bars, etc). The idlers 264 may be in two pairs. For example, the idlers 264 may form a first pair above the hole 262A and a second pair below the hole 262A. The idlers 264 may contact the cable 30 to ensure that the cable passes through the hole 262A, with limited friction so as to limit damage to the cable 30.

A cutter 265 may be slidingly received in the gap defined between the plates of the carriage 262. The cutter 265 may be a plate cutter, knife, etc, and may be constrained to transitional movement, though a rotational movement may be used as an alternative. The cutter 265 may be of the guillotine type, with a cutting edge 265A that is aligned relative to the hole 262A. Springs 266 bias the cutter 265 to a cutting position. The springs 266 may be coil spring(s), Belleville springs, etc, and exert suitable biasing force to cause a sectioning of the cable 30. More specifically, a strong biasing force is applied to the cutter 265 such that the cable 30 passing through the hole 262A would be sectioned if the cutter 265 were released from its loaded condition.

The cutter 265 is locked into a loaded condition by a detent mechanism 267. The release of the detent mechanism 267 causes the cutter 265 to guillotine the cable 30 by the action of the springs 266. According to an embodiment, the detent mechanism 267 may have a retaining member, such as balls 267A, that mechanically blocks the cutter 265 to retain it in the loaded condition. A plunger 267B may be lodged in the carriage 262 and may have a cavity that may align with the balls 267A so as to allow the balls 267A to disengage from the condition in which they retain the cutter 265 loaded. Detent 267C is charged with displacing the plunger 267B, and may be pivotally mounted to the carriage 262. The detent 267C may have a finger engaged with the plunger 267B such that a rotation of the detent 267C causes the translation of plunger 267B. The translational of the plunger 267B aligns its cavity with the balls 267A to deploy the cutter 265. An actuator 268 is used to release the cutter 265 in given circumstances, by acting on the detent mechanism 267. The actuator 268 may be an electrically powered device, such as a solenoid. The actuator 268 may be connected to the detent 267C of the detent mechanism 267 by way of linkage 269.

In operation, the cable 30 may thus be wound on the spool assembly 220. In an embodiment, the end of the cable 30 that is attached to the spool assembly 220 is not fixed to the spool assembly 220. For example, the end of the cable 30 may be laced to the spool assembly 220, so as to be releasable therefrom. The cable 30 may remain attached to the spool assembly 220 by a combination of its winding and inherent frictional forces. In an embodiment, during operation, the impactor apparatus 10 is given a height of operation, i.e., a maximum distance between the impactor mass 40 and the reeling apparatus 20. At such height of operation, a suitable amount of cable 30 remains wound onto the spool assembly 220 for a subsequent reeling action. In case of emergency, such as if the impactor mass 40 is stuck, the rotorcraft A may increase its altitude to a height at which the cable 30 detaches from its engagement with the spool assembly 220. Additionally, the reeling apparatus 20 may section the cable 30 if the cutter assembly 260 is present.

The controller unit 60 may be used to command the operation of the reeling apparatus 20, and may be part of a system to operate a method for impacting with an impactor mass. The controller unit 60 may include a processing unit, and a non-transitory computer-readable memory communicatively coupled to the processing unit and comprising computer-readable program instructions executable by the processing unit for operating the reeling apparatus 20 as described herein. For example, the controller unit 60 is connected to the various electrically components of the reeling apparatus 20 to operate the actuation system 230, the brake system 250 and/or the cutter assembly 260, if such components are present. This may include operating one or more of the motor 231, the braking actuator 254, the locking actuator 256, and/or the cutter actuator 268. For example, the controller unit 60 may start and stop the actuation system 230. In an embodiment, there is no clutch unit 240, with the controller unit 60 operating intermittently the actuation system 230 and the brake system 250 to wind the cable 30 and drop the mass 40. The controller unit 60 may release the brake system 250 if normally closed, or otherwise activate the brake system 250. The controller unit 60 may operate the cutter assembly 260 to section the cable 30, in emergency situations. The controller unit 60 may have a slave unit on the reeling apparatus 20, and a master unit in the cockpit (e.g., as part of the flight management console), or usable as a remote control or like handheld device (including smartphone and tablet). The controller unit 60 may consequently include wireless telecommunication capacity, or wired communication capacity. The various components of the controller unit 60 may be self-powered, with batteries.

During use, the reeling apparatus 20 is attached directly to the rotorcraft A or via a sling 50, as an example. The cable 30 is wound to the spool assembly 220 in such a way that the impactor mass 40 is in a loaded condition. In an embodiment, the brake system 250 is normally closed, whereby the brake system 250 ensures that the impactor mass 40 remains in the loaded condition. The locking actuator 256 may also assist in performing this function, or provide another level of safety supplementary to that of the brake system 250.

The rotorcraft A may then transport the impactor mass 40 in a hung arrangement, to reach an impacting site. For example, the impacting site may be one where a log jam or ice jam is present in a waterway (e.g., river, brook). Other circumstances are applicable, include the demolition of buildings and structures. The rotorcraft A hovers over the impacting target, within the height of operation (i.e., at most at the height of operation), and the impactor mass 40 is released by action of the brake system 250. The impactor mass 40 drops by gravity. In an embodiment, the brake system 250 is activated for the brake system 250 to remove its braking effort on the spool assembly 220. In this embodiment or in another embodiment, the locking actuator 256 may also be activated to stop its blocking effort on the spool assembly 220. Because of such release, the impactor mass 40 drops and impacts the impacting target.

In an embodiment, after impaction, the cable 30 must be wound to return the impactor mass 40 to a loaded condition. In an embodiment, this is partially achieved by the actuation system 230 or self-winding arrangement, and by the rotorcraft A reducing its altitude. These actions may for example occur simultaneously. In that way, the actuation system 230 or self-winding arrangement may dedicate their forces to the winding action, without being required to raise the impactor mass 40.

In an embodiment, the motor 231 continuously runs. However, the clutch unit 240 disengages the motor 231 from the spool assembly 220 such that the motor 231 does not have to lift the impactor mass 40. In such a scenario, the motor 231 is engaged to the spool assembly 220 only when there is a loss of tension in the cable 30, such as when the rotorcraft A reduces its altitude to wind the cable 30 on the spool assembly 220. As a result, the motor 231 may be of lesser size than a motor that would be tasked with lifting the impactor mass 40. The actuation system 230 is therefore tasked with maintaining the cable 30 taut and reeling in the cable 30, but may not be capable of supporting the impactor mass 40. This may be an action performed by the brake system 250 acting on the spool assembly 220.

In case of emergency, such as if the impactor mass 40 being stuck, the rotorcraft A may increase its altitude to a height at which the cable 30 detaches from its engagement with the spool assembly 220. It may also be possible to section the cable 30 using the cutter assembly 260.

In another embodiment, the impactor mass 40 is connected to the cable 30 by an electromagnet at the end of the cable 30, and operated by the controller 60 to release the impactor mass 40 when over an impacting site. The electromagnet could be used with the reeling apparatus 20 as an option. The cable 30 would be structural, i.e., support the impactor mass 40, but would also power the electromagnet.

The controller unit 60 may be part of a system for operating an impaction with an impactor mass at an end of at least one cable, with one or more processing unit, and a non-transitory computer-readable memory communicatively coupled to the processing unit and comprising computer-readable program instructions executable by the processing unit. The instructions may be for actuating a rotation of a spool to maintain the cable taut, and to wind the cable on the spool without raising the impactor mass; braking the rotation of the spool to hold the impactor mass in a loaded condition; and releasing the brake to cause a drop of the impactor mass by gravity, from the loaded condition. The computer-readable program instructions may further be for for activating a braking actuator for releasing the brake, and deactivating the braking actuator for braking the rotation; for activating a locking actuator to redundantly braking the rotation of the spool; for actuating a cutter to section the cable; and/or for operating an electromagnet to cause a drop of the impactor mass by gravity, from the loaded condition; for latching the impactor mass to the cable by operating the electromagnet.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An impactor apparatus for use with a rotorcraft, comprising:
 a reeling apparatus adapted to be transported by the rotorcraft, the reeling apparatus including at least
 a spool,
 an actuation system for rotating the spool in a winding direction, and
 a brake system for braking a rotation of the spool;
 a cable wound onto the spool; and
 an impactor mass attached to a free end of the cable, the actuation system configured to lift a maximum weight being less than a weight of the impactor mass;
 wherein a release of the brake system causes a drop of the impactor mass by gravity, from a loaded condition, the actuating system subsequently rotating the spool to wind the cable onto the spool to put the impactor mass in the loaded condition.

2. A rotorcraft, comprising:
 a fuselage;
 a rotor rotatably mounted to the fuselage and configured for propelling the rotorcraft; and
 an impactor apparatus mounted to the fuselage, the impactor apparatus having:
  a reeling apparatus adapted to be transported by the rotorcraft, the reeling apparatus including at least
  a spool,
  an actuation system for rotating the spool in a winding direction, and
  a brake system for braking a rotation of the spool;
  a cable wound onto the spool; and
  an impactor mass attached to a free end of the cable, the impactor mass adapted for demolition of an impacting site;
  wherein a release of the brake system causes a drop of the impactor mass by gravity, from a loaded condition, the actuating system subsequently rotating the spool to wind the cable onto the spool to put the impactor mass in the loaded condition.

3. The rotorcraft according to claim 2, wherein the reeling apparatus includes a clutch unit between the actuation system and the spool.

4. The rotorcraft according to claim 3, wherein the clutch unit includes at least one spring exerting a biasing force between the actuation system and the spool.

5. The rotorcraft according to claim 4, wherein the at least one spring surrounds a shaft of the actuation system, and is between an abutment surface secured to the shaft and a coupler secured to the spool.

6. The rotorcraft according to claim 5, wherein the coupler is a disk inside a cavity of a core of the spool.

7. The rotorcraft according to claim 4, wherein the at least one spring is at least one Belleville spring.

8. The rotorcraft according to claim 4, wherein the clutch unit includes a tensioner for adjusting the biasing force applied by the spring.

9. The rotorcraft according to claim 8, wherein the tensioner has at least one fastener applying a pressure on the at least one spring.

10. The rotorcraft according to claim 9, wherein the at least one fastener is located inside a cavity of a core of the spool and is accessed from an exterior of the reeling apparatus.

11. The rotorcraft according to claim 2, wherein the actuation system includes an electric motor and a gear box.

12. The rotorcraft according to claim 11, wherein a rotational axis of the motor is transverse to a rotational axis of the spool.

13. The rotorcraft according to claim 2, wherein the brake system includes a strap selectively applying a braking force on a drum surface of the spool.

14. The rotorcraft according to claim 13, wherein the brake system includes a piston and at least one brake spring biasing the brake system to apply the braking force.

15. The rotorcraft according to claim 14, wherein the brake system includes a braking actuator operatively connected to the piston to apply a force against a biasing action of the at least one brake spring to release the braking force.

16. The rotorcraft according to claim 14, wherein the brake system includes a locking actuator operatively connected to the piston to apply a force concurrent with a biasing action of the at least one brake spring to lock the brake system.

17. The rotorcraft according to claim 2, wherein the reeling apparatus includes a cutter assembly adjacent to the cable and operable to section the cable.

18. The rotorcraft according to claim 17, wherein the cutter assembly has a frame defining a hole for passage of the cable therethrough, and a cutter in guillotine arrangement with the hole.

19. The rotorcraft according to claim 18, wherein the cutter is spring-loaded in a loaded condition, the cutter assembly having a detent mechanism for releasing the cutter from the loaded condition.

20. The rotorcraft according to claim 2, wherein an end of the cable opposite the free end is releasably laced to the spool.

* * * * *